H. H. GUMZ.
ADJUSTABLE COMBINED WELDING AND CUTTING TORCH.
APPLICATION FILED JULY 24, 1916.
1,205,195.
Patented Nov. 21, 1916.
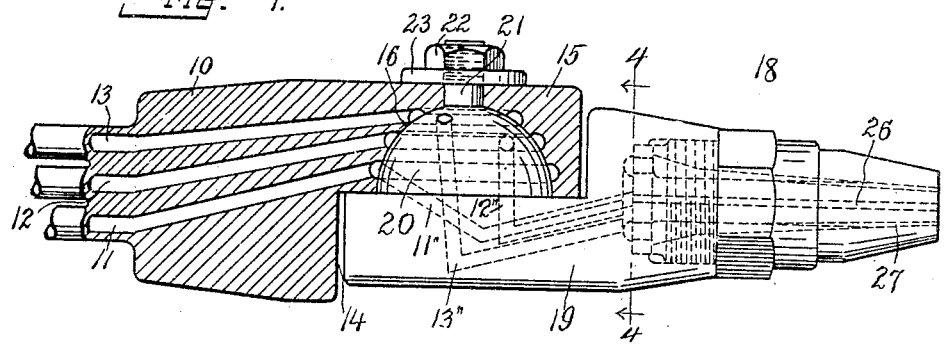
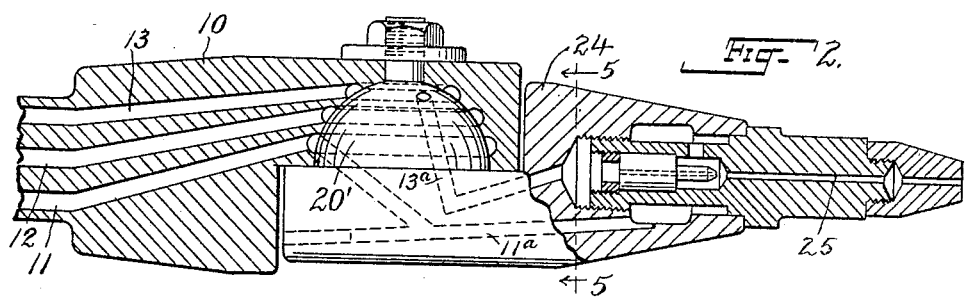
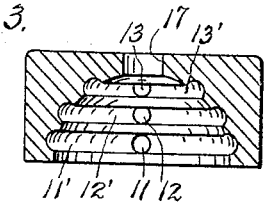
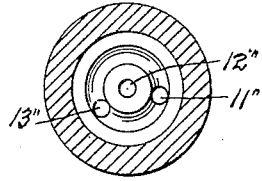
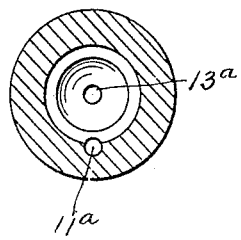
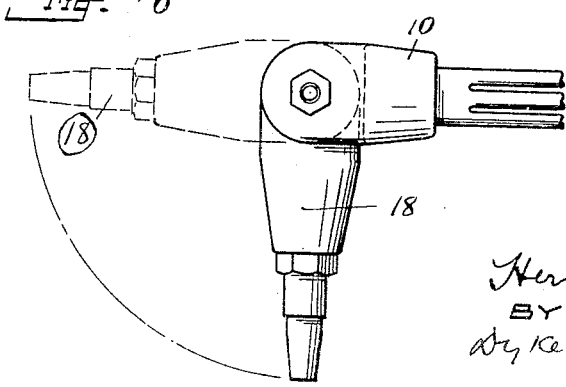
INVENTOR
Herman H. Gumz
BY
Dyke & Canfield, his
ATTORNEYS

UNITED STATES PATENT OFFICE.

HERMAN H. GUMZ, OF NEWARK, NEW JERSEY.

ADJUSTABLE COMBINED WELDING AND CUTTING TORCH.

1,205,195.

Specification of Letters Patent. Patented Nov. 21, 1916.

Application filed July 24, 1916. Serial No. 110,897.

*To all whom it may concern:*

Be it known that I, HERMAN H. GUMZ, a citizen of the United States, and a resident of Newark, county of Essex, and State of New Jersey, have invented certain new and useful Improvements in Adjustable Combined Welding and Cutting Torches, of which the following is a specification.

My invention relates to torches adapted for the production of high heat by combustion of gases issuing from a nozzle and utilizing a combustible mixture of gases, as, for example, oxygen and acetylene, and the invention relates more particularly to the construction of the nozzle base and the head to which the nozzle is secured in such manner as that the nozzle may be directed through a variety of angles and so that the apparatus may be converted from a cutting to a welding torch by the simple expedient of changing the nozzle.

With the foregoing and related objects in view, my invention consists in the constructions, parts, improvements and combinations herein set forth and claimed.

In the accompanying drawing forming a part of this specification and wherein the same reference characters are uniformly used to designate the same parts throughout, I have illustrated, for the purpose of making my invention clearly understood, one form of apparatus in which my invention may be embodied. It is to be understood that the same is intended only for the purpose of affording a clear understanding of the invention, and that the invention is not to be limited to the specific form shown, but may be embodied in a variety of forms so long as the principle of my invention is utilized.

In the said drawing, Figure 1 is a side view partly in cross section and showing a torch with a cutting nozzle attached. Fig. 2 is a view similar to Fig. 1, but showing a welding nozzle substituted for the cutting nozzle. Fig. 3 is a cross-sectional view showing the interior construction of the nozzle attaching means. Fig. 4 is a cross-sectional view taken on the line 4—4, Fig. 1. Fig. 5 is a cross-sectional view taken on the line 5—5, Fig. 2, and Fig. 6 is a side view showing an adjusted nozzle position in dotted lines.

The apparatus shown herewith is designed for use with acetylene and oxygen gases, but it is to be understood that other gases and mixtures of gases may be used in apparatus embodying the present invention.

Reference numeral 10 designates the body portion or head of the torch, and it is provided with the requisite number of gas passages, three passages 11, 12 and 13 being shown. The center passage in the form shown is for supplying oxygen, and one of the other of the passages 11 and 13 is supplied with oxygen and one with acetylene, so that there are two oxygen supplying passages, namely, 12 and either 11 or 13, the remaining passage, either 11 or 13, being arranged to be supplied with acetylene. The head 10 is cut away at one side of its front end as shown at 14 to arrange for the convenient attachment of a nozzle and has a projecting part 15 which is provided with a seat 16 preferably of hemispherical form, and about the seat 16 a number of grooves as 11', 12' and 13' are provided to communicate with the passages 11, 12 and 13, respectively. An opening 17 is provided at the base of the seat 16 for the reception of the nozzle shank. The nozzle shown in Fig. 1 is provided with three gas passages, and it is intended for cutting work. Such nozzle is indicated by the numeral 18 and, so far as the mixing and discharge apertures and arrangements are concerned, may be of any convenient form. Such nozzle has a base 19 halved to the head 10 and provided with passages 11'', 12'' and 13'' communicating with the annular grooves 11', 12' and 13', respectively, and the inner ends of these passages in the nozzle base are formed in a hemispherical projection 20 of the nozzle base 19 fitting within the hemispherical seat 16, and such hemispherical member 20 has a shank 21 passing through the opening 17 and carries on the outer end a fastening means, as a nut 22 and washer 23.

The welding nozzle 24, shown in Fig. 2, may likewise be of any preferred construction, being supplied, however, with but two gas passages 11ᵃ and 13ᵃ which terminate in the hemispherical projecting part 20' and communicate with the passages 11 and 13 in the head 10. As the particular construction of the nozzle is unimportant, the same need not be described in detail, but it will be noted that in the case of the welding nozzle the mixed gases pass out through a single passage 25, whereas in the case of the cutting nozzle 18, in addition to the central passage 26 of the cutting nozzle through which oxygen is supplied from the central passage 12, there is a surrounding passage or series of passages 27 by means of which mixed oxygen and acetylene are provided in the usual fashion for cutting nozzles. When the welding nozzle is used, as shown in Fig. 2, there being no passage corresponding to the central supply passage 12 in the hemispherical member 20', the same is cut off so that all the gases used come from the passages 11 and 13, one of which, as already stated, is arranged for a supply of oxygen and the other for a supply of acetylene.

It will be observed that, as shown in Fig. 6, the welding or cutting nozzle can be turned through a variety of angles as may be desired, the range of such turning as illustrated in Fig. 6 being through an angle of 90°. Such rotation may conveniently be effected by loosening the nut 22 slightly and turning the nozzle to the desired position and again tightening the nut 22. In order to change the nozzles it is only necessary to remove the nut 22, whereupon the nozzle in use can be taken out and another substituted with the utmost ease.

It will be seen that apparatus in accordance with the present invention has a number of features of advantage, and that with a single head and a plurality of interchangeable nozzles adapted for the work to be performed the torch may be used for a variety of uses, taking the gas from all three of the supply pipes or from two of the supply pipes, as may be desired.

The form of construction illustrated is one which is very readily made up and which can be supplied very cheaply, and all the parts of which are readily and conveniently accessible for cleaning.

Having thus described my invention, I claim:

1. In a gas burning torch, the combination of a body member having its end cut away at one side and having a hemispherical recess on the inner side of the remaining part, said recess being provided with annular grooves extending therearound, the body member being supplied with gas passages communicating with said grooves, a gas burning nozzle having a hemispherical projecting part received within the said recess and having gas passages terminating in said hemispherical part in communication with said grooves.

2. In a gas burning torch, a body member provided with a substantially hemispherical recess and with an aperture at the base of said recess, a nozzle having a hemispherical projection adapted to be received within said recess and having a fastening shank extending through said aperture, and means for supplying a plurality of gases from said body member to said nozzle.

3. In a gas burning torch, a body member and a nozzle member halved together, means including a lateral projection on one of said members and a recess in the other of said members for swiveling the nozzle on the body member, and means within the swivel means for supplying gas from the body member to the nozzle in all the swiveling positions of the nozzle.

4. In a gas burning torch, a body member having a recess therein of decreasing size toward its bottom, a nozzle member provided with a lateral extension fitting in said recess and mounted to turn thereon, and means for supplying a plurality of gases from said body member through said projection to said nozzle member.

In testimony that I claim the foregoing, I hereto set my hand, this 22nd day of July, 1916.

HERMAN H. GUMZ.